UNITED STATES PATENT OFFICE.

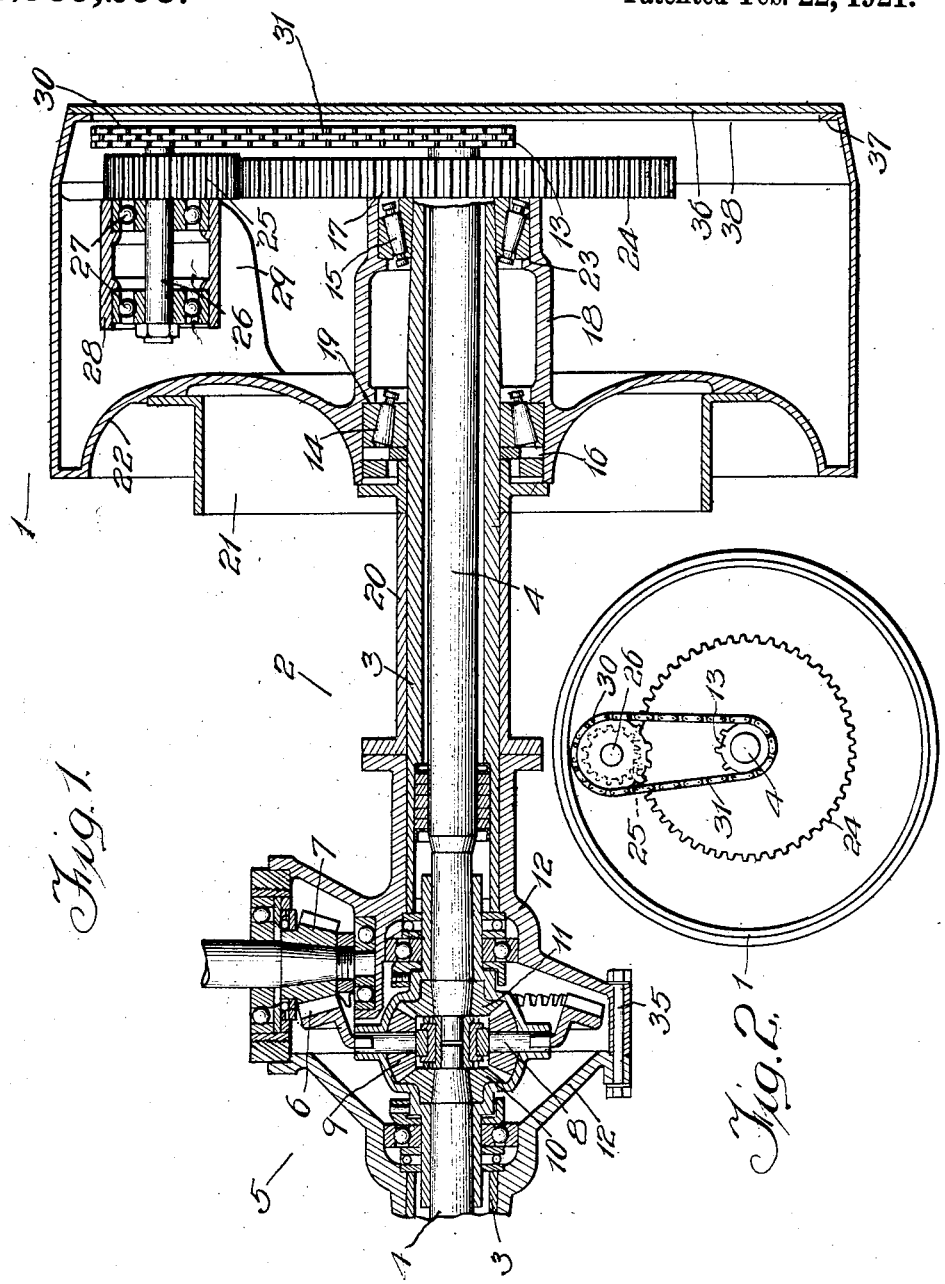

GEORGE M. WILLIS, OF CHICAGO, ILLINOIS.

DRIVING MECHANISM.

1,369,206.   Specification of Letters Patent.   Patented Feb. 22, 1921.

Application filed May 13, 1920. Serial No. 380,977.

*To all whom it may concern:*

Be it known that I, GEORGE M. WILLIS, a citizen of the United States, residing at Chicago, in the county of Cook and State of Illinois, have invented a certain new and useful Improvement in Driving Mechanisms, of which the following is a full, clear, concise, and exact description, reference being had to the accompanying drawings, forming a part of this specification.

My invention relates to driving mechanisms and more particularly to driving mechanisms of the type adapted for direct association with the traction wheels of a motor vehicle for applying the power from the engine thereto.

The prior art has provided various types of drives (chain, gear, worm, etc.) for transmitting the power from the engine to the propelling of the vehicle. While the chain drive is better adapted to rough surfaces or road beds, the gear drives are otherwise considered superior. The advantages of associating an additional drive mechanism with each of the traction wheels for applying the power from the engine are well known to those skilled in the art. In the first place, the driving strain is distributed between the differential and this final drive mechanism relieving the driving strain in the differential and making a reduction in the dimensions thereof practical. Furthermore, a second speed reduction, as well as an increased power application leverage may be thereby had at the wheel. These are advantageous particularly in connection with heavy duty vehicles.

The final drives of the prior art have comprised coöperating gearings frequently including an internal ring gear between the live axle and the wheel. I have found that these final drives like the gear drives for transmitting the power from the engine are better adapted for one class of service than another. The complexity of such mechanisms has been great and the problem of assembly and dismantling a difficult one.

It is an aim of my invention to provide a driving mechanism which will operate effectively under all conditions of operation, those conditions under which chain drive vehicles, as well as those under which gear drives have been operated heretofore.

It is a further aim of my invention to provide a novel, simple and compact driving mechanism which may be cheaply manufactured and easily assembled and dismantled.

Other aims of my invention not hereinbefore set forth will appear from the following detailed description and the claims taken with an inspection of the accompanying drawings in which, Figure 1 is an axial section through the traction wheel of a motor vehicle and its associated drive axle showing a driving mechanism embodying my invention arranged therebetween; and Fig. 2 is an outer face view on a somewhat reduced scale of the wheel with the outer closure plate removed to show the arrangement of the driving mechanism.

Generally, my invention provides means whereby the power is applied from the drive or live axle of the vehicle to the wheel through a driving mechanism including a planet gear driving from the drive axle by means of a suitable driving chain arranged therebetween and a coöperating fixed gear providing a track about which the planet gear and consequently the wheel of the vehicle are revolved.

Referring to the drawings, 1 designates a traction wheel of a motor vehicle and 2 designates generally the drive axle associated therewith. The drive axle 2 comprises a pair of alined axle tubes 3—3 through which axle tubes the drive axle sections or spindles 4—4 are arranged. These tubes 3—3 constitute the dead axles or supports upon the ends of which the wheels are journaled, and which receive the load stresses. The traction wheel 1 is mounted to revolve about the outer end of the axle tube 3. The power for propelling the vehicle is transmitted to the drive axle sections 4—4 by way of a suitable differential 5 interposed between the adjacent ends thereof.

The beveled gear 6 of the differential 5 is driven from the propeller or drive shaft of the vehicle through an intermeshing pinion 7. Pinions 9 revolubly mounted upon spindles or relatively short shafts 8 carried by the beveled gear 6 are interposed between and mesh with the opposed beveled gears 10 and 11 fixed upon the adjacent ends respectively of the drive axle sections 4—4. The differential mechanism in inclosed in a casing comprising a pair of casing sections 12—12 into the oppositely projecting sleeved portions or tubular extensions of which the inner ends of the axle tubes 3—3 are telescoped substantially as shown. The casing sections 12—12 may be clamped together by means of suitable bolts 35 or in any other desired manner.

The outer ends of each of the drive axle sections 4—4 which drive axle sections are arranged substantially co-axial with the axis of rotation of the traction wheel 1 are provided with sprockets 13 fixedly mounted thereupon. The outer end of the axle tube 3 terminates short of the sprocket 13 and is journaled in radial bearings 14 and 15 which radial bearings are arranged in suitable bores 16 and 17 respectively provided in the hub 18 of the wheel 1. The bearing 14 is retained in place between a shoulder 19 terminating the bore 16 provided in the hub 18 and the outer end of a sleeve 20 the inner end of which sleeve 20 abuts against the outer end of the projecting sleeved or tubular portion of the differential casing section 12. A brake drum 21 is attached to the inner disk like wall 22 of the wheel 1. Suitable bracket members (not shown) carried by the sleeve 20 may be provided with brake shoes for coöperation with the drum 21 or any suitable form of brake band may be employed.

The bearing 15 is retained in place between a shoulder 23 terminating the bore 17 provided in the hub 18 and a spur gear 24 fixed upon the outer end of the non-rotatable axle tube 3. This gear 24 forms a fixed track about which a planet pinion 25 and consequently the wheel 1 is revolved as will be hereinafter made apparent. The planet pinion 25 is fixed upon a short shaft or spindle 26 the inner end of which shaft or spindle is journaled in the radial bearings 27—27 arranged in a hollow boss 28 formed in the web 29 which web 29 is in turn formed preferably integral with the rim of the wheel 1. Of course, the radial bearings 27—27 may be arranged in a suitable bearing bracket bolted to the web 29 or otherwise suitably attached to the wheel. The outer end of the short shaft or spindle 26 is provided with a driven sprocket 30 fixedly mounted thereupon. The driving sprocket 13 and the driven sprocket 30 are connected by a suitable driving chain 31.

The drive mechanism within the traction wheel 1 is inclosed in a chamber defined by the rim of the wheel by the inner disk like wall 22 and by an outer closure plate 36 bolted or otherwise suitably secured to the marginal flange 37 defining the opening 38 in the outer end or face of the wheel. Access to the entire driving mechanism housed within the wheel 1 is had by removing the closure plate 36. The housing or chamber inclosing the driving mechanism protects the same and may hold lubricating oil insuring proper lubrication of the various parts at all times, particularly so by reason of the rotation of the chain 31, sprocket 30 and pinion 25 as a unit about the axis of the driving sprocket 13.

It is believed that the operation of the device is obvious. The power transmitted through the differential 5 and through the live axle 4 is transmitted from the live axle 4 through the chain 31 and coöperating sprockets 13 and 30 to the short shaft 26 and pinion 25 carried thereby. Rotation of the pinion 25 by reason of its engagement with the fixed gear 24 causes revolution of the pinion 25 and consequently revolution of the wheel 1 about the end of the axle tube 3. The particular relative dimensions of the pinion 25 and the gear 24 as well as the relative dimensions of the sprockets 13 and 30 and consequently the speed reduction secured in my improved drive is immaterial. Transmission of the drive from the live axle 4 to the short shaft or spindle 26 through coöperating gears instead of the drive chain 31 is contemplated.

The feature of securing the respective advantages of a gear or a shaft drive and a chain drive, as well as the great speed reduction which may be secured in the wheel itself without increasing the dimensions thereof, together with the provision for distributing the driving strain between the differential and the drive associated with the wheel are highly important aspects of my invention.

While I have described the invention in connection with the details of a particular embodiment, I do not intend thereby to limit the invention to such details as I am aware and contemplate that modifications and changes may be made without departing from the invention which is set out in the appended claim.

I claim:

In a transmission, a hollow supporting axle, a traction wheel journaled on and near the outer end of the axle, an external spur gear of relatively large diameter keyed upon the end of the axle, a driving spindle extending through the axle and having a sprocket pinion keyed thereto beyond the end of the axle, a shaft journaled on the wheel adjacent the periphery thereof in order to impose the driving effort upon the wheel at a point remote from the center of the wheel, whereby a better leverage upon the wheel is secured, a spur pinion of relatively small diameter as compared with the diameter of the spur gear, mounted on said shaft and meshing with said spur gear, a sprocket gear also mounted on said shaft and rigidly connected with said spur pinion, and a driving chain trained over said sprocket pinion and said sprocket gear to transmit the driving effort of the spindle to the wheel, said sprocket pinion and gear being spaced apart to permit of the employment of a relatively large gear ratio between the spur gear and pinion whereby the driving stresses imposed upon the sprockets, the chain, the shaft and the wheel are relatively small.

In witness whereof I hereunto subscribe my name, this 6th day of May, 1920.

GEORGE M. WILLIS.